W. K. MOSCHEL.
TROLLEY CATCHER.
APPLICATION FILED NOV. 8, 1919.
1,370,146.
Patented Mar. 1, 1921.
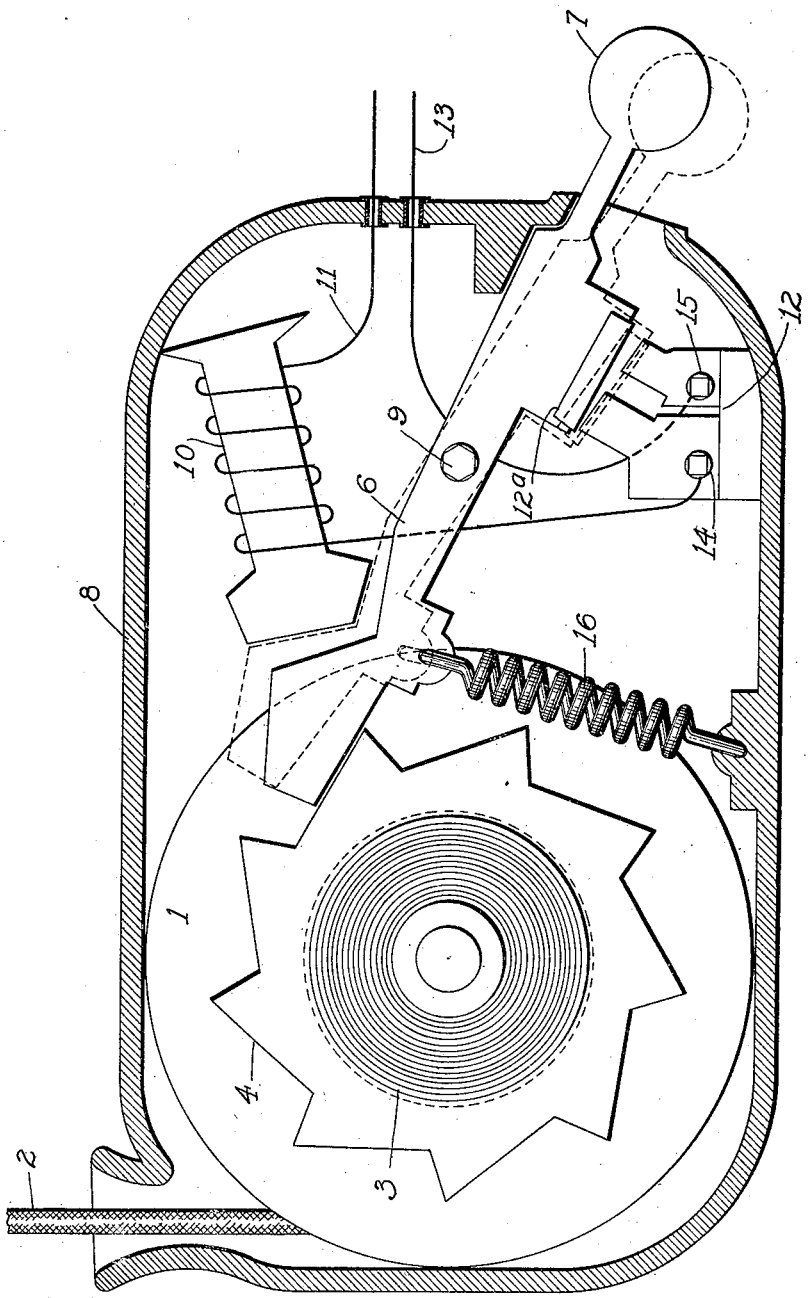
Inventor
William K. Moschel
By Sheridan, Jones, Sheridan & Smith.
Attys.

UNITED STATES PATENT OFFICE.

WILLIAM K. MOSCHEL, OF ROCKFORD, ILLINOIS.

TROLLEY-CATCHER.

1,370,146.                Specification of Letters Patent.         Patented Mar. 1, 1921.

Application filed November 8, 1919. Serial No. 336,681.

*To all whom it may concern:*

Be it known that I, WILLIAM K. MOSCHEL, a citizen of the United States, residing at Rockford, in the county of Winnebago and State of Illinois, have invented certain new and useful Improvements in Trolley-Catchers, of which the following is a specification.

My invention relates to new and useful improvements in trolley catchers and has for its object the prevention of the rising of the trolley pole when the trolley wheel jumps from the trolley wire, this causing damage to the cross wires and the pole itself.

The principal object of my invention is to provide a trolley catcher in which unwinding of the trolley is prevented upon breaking of the contact between the trolley and the current wire.

Still another object is the provision of such a device in which an electromagnetic member serves to normally maintain the detent, which prevents unwinding, out of operative position during normal conduct of the trolley together with means to positively break the exciting circuit for such member upon breaking of the contact by the trolley, such means requiring positive replacement before the electromagnetic member will again function.

These and other objects will be more fully set forth and described in the following specification and shown in the accompanying drawing in which is shown a section through a case of my device, the remainder of the mechanism being shown in elevation.

Briefly described my invention is as follows. Numeral 1 designates a reel of ordinary construction carrying trolley rope 2. The reel is actuated by spiral spring 3 in a manner hereinafter described. Carried by the reel is the ratchet 4, the teeth of which are adapted to be engaged by the pawl or detent 6, the handle 7 of which extends beyond the casing 8. The lever is pivoted at 9. An electromagnet 10 is provided which is energized by current from the trolley passing through wire 11. A one-pole switch 12 is provided which coacts with the switch blade 12ª carried by the pawl 6. When in the position shown in dotted lines the circuit is completed from the trolley to the ground through the ground wire 13, which is grounded in the usual way. Switch posts are indicated at 14 and 15 and 16 is a spring of sufficient strength to normally move the pawl into engagement with the ratchet 4 and to thereby open the switch 12 when the electromagnet is deënergized by the trolley wheel breaking contact with the current wire.

The operation of the device is as follows. When the trolley is placed in normal contact with the current wire, and handle 7 is lowered so that the switch 12 completes the circuit from the electromagnet 10 to the ground, the electromagnet is energized and the pawl 6 is simultaneously moved from engagement with the ratchet 4. The reel 1 will then wind up any slack in the rope 2 or allow the rope to unwind in accordance with the lowering or the rising of the trolley pole. Should the trolley wheel jump the trolley wire, the electromagnet is deënergized and the spring 16 immediately draws the pawl 6 into engagement with the ratchet 4, thus preventing the unwinding of the rope and therefore the rising of the trolley pole. Should the trolley pole strike a cross wire or other overhead obstacle and rebound, the slack in the rope will be taken up by the action of the spiral spring 3 which actuates the reel, thus holding the pole down in a safe position. Should the trolley wheel make contact with the current wire accidentally, the ratchet will not be released because the circuit cannot be established until the handle 7 of the pawl is manually lowered to the position of the dotted lines. To put the trolley wheel back in its normal position on the wire, the handle 7 is pushed into its lower position, thus bringing the knife blade 12ª into engagement with the switch 12, and at the same time lifting the pawl 6 out of engagement with the ratchet wheel 4 when the reel 1 will be free to feed out the rope as required for the making of contact with the trolley wheel and the trolley wire. Should the spring, which elevates the trolley pole, be of such strength that the conductor will require both hands to place the trolley wheel in position on the wire, he can first lower the handle 7 and pull from the reel the necessary slack, then raise the handle so that the pawl 6 engages the ratchet wheel 4 and then with both hands make the necessary adjustment of the wheel upon the wire. When the contact has thus been made, the handle should again be lowered to the position shown by the dotted lines when the circuit will be established and the electromagnet 10 energized, thus magnetically holding the pawl 6 out of contact with the ratchet, leaving the reel free to take up slack or give out the rope as required by the varying elevation of the trolley wire.

What I claim is:—

1. In a device of the class described, a spring-actuated reel, a ratchet carried thereby, and a pawl engageable with said ratchet to prevent unwinding of said reel, said pawl being pivoted and provided with a manually engageable handle portion.

2. In a device of the class described, a spring-actuated reel, a ratchet carried thereby, a pawl engageable with said ratchet, said pawl being pivoted, means normally maintaining said pawl in engagement with said ratchet, means operable to withhold said pawl from such engagement, said last-named means comprising an electromagnetic member, a switch in circuit with said member, and means carried by said pawl to contact with said switch to thereby close said circuit.

3. In a device of the class described, a ratchet and pawl engageable therewith, a spring normally operative to maintain said pawl in engagement with said ratchet, an electromagnet to withhold said pawl from such engagement, said pawl being pivoted and provided with a manually engageable portion, a switch in circuit with said electromagnet, and a knife blade carried by said pawl movable to and from engagement with said switch to close or open said electromagnetic circuit.

In testimony whereof I have subscribed my name.

WILLIAM K. MOSCHEL.